US011136114B2

(12) United States Patent
Rowlands et al.

(10) Patent No.: US 11,136,114 B2
(45) Date of Patent: Oct. 5, 2021

(54) CONTROL SYSTEM AND METHOD FOR LANDING GEAR EXTENSION/RETRACTION

(71) Applicant: Airbus Operations Ltd., Bristol (GB)

(72) Inventors: Martin Griffith Rowlands, Bristol (GB); Maxwell William Jones, Bristol (GB); Graham King, Bristol (GB); Trevor Anthony Brighton, Bristol (GB); Matthew Gadd, Bristol (GB)

(73) Assignee: Airbus Operations Limited, Bristol (GB)

( * ) Notice: Subject to any disclaimer, the term of this patent is extended or adjusted under 35 U.S.C. 154(b) by 83 days.

(21) Appl. No.: 16/556,651

(22) Filed: Aug. 30, 2019

(65) Prior Publication Data

US 2020/0055592 A1 Feb. 20, 2020

Related U.S. Application Data

(63) Continuation of application No. PCT/EP2018/054817, filed on Feb. 27, 2018.

(30) Foreign Application Priority Data

Mar. 2, 2017 (GB) ..................................... 1703403

(51) Int. Cl.
*B64C 25/26* (2006.01)
*B64C 25/16* (2006.01)

(52) U.S. Cl.
CPC .............. *B64C 25/26* (2013.01); *B64C 25/16* (2013.01)

(58) Field of Classification Search
CPC ................................. B64C 25/16; B64C 25/26

(Continued)

(56) References Cited

U.S. PATENT DOCUMENTS 2,815,819 A * 12/1957 Marshall ................ B64D 37/32
169/61
8,175,762 B2 * 5/2012 Trotter .................... B64C 25/26
701/16

(Continued)

FOREIGN PATENT DOCUMENTS

EP        2 082 956 A2    7/2009
EP        3 026 867 A1    6/2016
JP        2006142869 A  * 6/2006

OTHER PUBLICATIONS

International Search Report and Written Opinion for Application No. PCT/EP2018/054817 dated Apr. 30, 2018.

*Primary Examiner* — Shelley Chen
(74) *Attorney, Agent, or Firm* — Jenkins, Wilson, Taylor & Hunt, P.A.

(57) ABSTRACT

A control system has first and second processing modules for controlling retraction and extension of an aircraft landing gear assembly. The processing modules operate independently providing redundancy. Each processing module is configured to perform a first sequence of steps for retracting the landing gear assembly and a second sequence of steps for extending the landing gear assembly. A step of switching control from one processing module to the other (e.g. an avionics side changeover step) is performed (a) as part of the first sequence of steps, but only after the landing gear assembly has been retracted, or (b) as part of the second sequence of steps. By ensuring that the step of switching control is performed at such times, and not for example between initiation of the first sequence of steps and the retraction of the landing gear assembly, the landing gear assembly may be retracted sooner after such initiation.

15 Claims, 8 Drawing Sheets

(58) Field of Classification Search
USPC .......................................................... 701/49
See application file for complete search history.

(56) References Cited

U.S. PATENT DOCUMENTS

| | | | |
|---|---|---|---|
| 8,191,827 B2* | 6/2012 | Reynes | B64F 5/60 |
| | | | 244/1 OOR |
| 9,611,035 B2* | 4/2017 | Iordanidis | B60T 13/741 |
| 2014/0151501 A1* | 6/2014 | Kondo | B64C 25/22 |
| | | | 244/102 R |

* cited by examiner

CONTROL SYSTEM AND METHOD FOR LANDING GEAR EXTENSION/RETRACTION

CROSS-REFERENCE TO RELATED APPLICATIONS

This application is a continuation of and claims priority to PCT/EP2018/054817, filed Feb. 27, 2018, which claims the benefit of and priority to GB Patent Application No. 1703403.4 filed Mar. 2, 2017, the entire disclosures of which are incorporated by reference herein.

BACKGROUND

The disclosure herein concerns a control system for landing gear extension/retraction and a related method. The disclosure herein also concerns an aircraft comprising such a control system, and also a processing module and computer program product for such a control system.

The disclosure herein has particular application in relation to large commercial passenger aircraft, but may have application in relation to other types of aircraft having one or more landing gear assemblies which are arranged to extend (for example, to be deployed) and to retract (to be stowed, in a landing gear bay, for example). If the time taken for the landing gear to retract and/or extend could be shortened that could enable drag to be reduced, by reducing the amount of time the landing gear assembly is exposed in the airflow around the aircraft.

When a landing gear extension/retraction is performed, there may be various steps which are performed for the purposes of enhanced safety and reliability or are for some other reason necessary/preferred. For example, the landing gear bay may be closed off to the outside of the aircraft by one or more landing gear bay doors. Such doors may need to be independently opened, closed, and/or locked in position when retracting and/or extending the landing gear assembly. Movement of such locks may be associated with actuators, for example including solenoid valves, that are operated under the control of an electronic control system. The electronic control system may need to control other actuators during landing gear extension/retraction operations. The electronic control system may be associated with various sensors in order to detect the position of the landing gear assembly, the landing gear bay door(s), the locks and/or other parts associated with the movement of the landing gear assembly. The electronic control system may be configured to perform a sequence of steps in a particular order interacting with such actuators, sensors and the like. The performance of one step may depend on receipt of confirmation of the satisfactory performance of a preceding step. There may be more than one electronic control system so as to provide redundancy, and in such cases the landing gear extension/retraction operations may include a step of switching control between one such electronic control system and another, in order to provide a check that both electronic control systems are functioning correctly. In an aircraft, where such electronics control systems form part of the avionics system(s) on the aircraft, the step of switching control may be referred to as an avionics side changeover (i.e. switching between independent sides of the avionics system, one side being redundant). The number of separately identifiable steps that need to be performed in sequence may be greater than ten. Each step may have a certain amount of time associated with it.

The disclosure herein seeks to mitigate one or more of the above-mentioned problems. Alternatively or additionally, the disclosure herein seeks to provide an improved control system for retracting and extending a landing gear assembly in an aircraft and/or an improved related method.

SUMMARY

The disclosure herein provides, according to a first aspect, a control system for retracting and extending a landing gear assembly in an aircraft. The control system comprises a first processing module and a second processing module. Each of the first and second processing modules is able to control retraction of the landing gear assembly independently of the other, and each of the first and second processing modules is able to control extension of the landing gear assembly independently of the other, thus providing redundancy. If one of the first and second processing modules fails, the other is able to take over control. Each of the processing modules is configured to perform a first sequence of steps for retracting the landing gear assembly and a second sequence of steps for extending the landing gear assembly. At least one of the first sequence of steps and the second sequence of steps includes a step of switching control from one of the first and second processing modules to the other. The step of switching control is performed (a) as part of the first sequence of steps for retracting the landing gear assembly, but only after the landing gear assembly has been retracted, or (b) as part of the second sequence of steps for extending the landing gear assembly. By performing the step of switching control at such a time, valuable time may be saved and the landing gear may be retracted sooner than if the step of switching control is performed during the first sequence of steps for retracting the landing gear assembly and before the landing gear assembly has been retracted. It is estimated that on some aircraft the time-saving may be greater than 100 milliseconds. Being able to retract the landing gear sooner, enables drag on the aircraft between take-off and gear retractions to be reduced, with consequent fuel savings and improvements in take-off performance. Such improvements in take-off performance may in effect increase the maximum take-off weight for a given aircraft. Thus, the inventors have recognised the opportunity for time-savings not by reducing the time taken by any of the individual steps performed when retracting or extending the landing gear, but by reordering the steps performed. The time-saving made advantageously enables the time in which the landing gear remains deployed after take-off to be reduced. This may increase the time taken for other parts of the overall landing gear retraction/extension process, but the inventors have recognised that the benefit of reducing the time it takes for the landing gear to be retracted immediately after take-off far outweighs any effect of increasing the time taken for other aspects of the extension/retraction of the landing gear.

It is preferred that the first sequence of steps for retracting the landing gear assembly does not include a step of switching control before the landing gear assembly has been retracted. It may be that there is only one step of switching control during successive performances of both the first sequence of steps and the second sequence of steps.

The number of separately identifiable steps that need to be performed as part of the first sequence may be greater than ten. The number of separately identifiable steps that need to be performed as part of the second sequence may be greater than ten. One or more such steps may have a certain amount of time associated with it. It may be that each step has a certain amount of time associated with it.

In the case where the step of switching control is performed as part of the first sequence of steps (for retracting the landing gear assembly), the step of switching control may be performed after a step of issuing a control signal that causes the landing gear bay doors to close. For example, each processing module may be so configured that the step of switching control is performed after locking of one or more landing gear bay doors. Each processing module may be so configured that the step of switching control is performed after the performance of a step of issuing a control signal that causes locking of one or more landing gear bay doors. Alternatively, or additionally, each processing module may be so configured that the step of switching control is performed after the receipt of a signal that indicates that one or more landing gear bay doors have been locked in the closed position.

In the case where the step of switching control is performed as part of the second sequence of steps (for extending the landing gear assembly), it may be performed after the landing gear assembly has been extended. For example, each processing module may be configured to perform the step of switching control after a step of issuing a control signal that causes one or more landing gear bay doors to close (once the landing gear assembly has been extended). It may be that each processing module is configured to perform the step of switching control after locking of the landing gear bay door(s) in the closed position. Each processing module may be so configured that the step of switching control is performed after the performance of a step of issuing a control signal that causes locking of one or more landing gear bay doors. Alternatively, or additionally, each processing module may be so configured that the step of switching control is performed after the receipt of a signal that indicates that one or more landing gear bay doors have been locked in the closed position.

In the case where the step of switching control is performed as part of the second sequence of steps (for extending the landing gear assembly), it may be performed before the landing gear assembly starts moving from its retracted position to its extended position. For example, the processing modules may each be configured to perform the step of switching control before a step of issuing the control signal that causes landing gear bay doors to open. It may be the case that the step of switching control is performed before a step of issuing a control signal that causes unlocking of the landing gear bay doors. The step of switching control may be performed at the start of the sequence of steps for extending the landing gear assembly, for example immediately after receipt of a control signal or other input that initiates the second sequence of steps for extending the landing gear assembly. Initiation of the sequence of steps for extending the landing gear assembly may be effected by a pilot operated mechanism, for example in the form of a switch, lever, button or the like. It may in certain embodiments be possible for the pilot to use such a mechanism to cause the switching of control between the first and second processing modules, while stopping the processing modules from proceeding with performing subsequent steps in the sequence of steps for extending the landing gear assembly. For example, it may be that the pilot can move a lever to a "DOWN" position (in order to start the sequence of steps for extending the landing gear assembly) and then immediately move the lever back from the "DOWN" position, so as to abort the sequence of steps apart from the step of the switching of control between the first and second processing modules.

It is possible that the step of switching control is performed both (a) as part of the first sequence of steps for retracting the landing gear assembly, but only after the landing gear assembly has been retracted, and (b) as part of the second sequence of steps for extending the landing gear assembly.

The disclosure herein also provides an aircraft comprising a control system according to the disclosure herein, possibly incorporating any optional features relating thereto. Such an aircraft will typically include one or more landing gear assemblies controlled by the control system. The aircraft may include a nose landing gear (NLG) assembly controlled by the control system. The aircraft may include one or more main landing gear (MLG) assemblies controlled by the control system. There may be one or more sensors arranged to detect when the landing gear assembly is in the extended position and/or to detect when the landing gear assembly is in the retracted position. Each landing gear assembly on the aircraft may be associated with a landing gear bay, which accommodates the landing gear assembly when retracted. The landing gear bay may be associated with one or more doors, which may be moveable to close over, at least partially, the landing gear bay when the landing gear is fully extended and/or when the landing gear is fully retracted. The door(s) may be configured to open to allow passage of the landing gear when moving between its retracted and extended positions. There may be one or more sensors arranged to detect when the one or more landing gear bay door(s) are open and/or to detect when the one or more landing gear bay door(s) are closed. The landing gear bay door(s) may be associated with one or more locks, which lock the door(s) in a closed position. The locks may be moved/retained with the use of one or more actuators, possibly electromechanically operated actuators, comprising solenoid driven valves for example. There may be one or more sensors arranged to detect when the one or more locks are locked and/or to detect when the one or more locks are unlocked.

The aircraft may be a commercial passenger aircraft, for example an aircraft capable of carrying more than fifty passengers, for example more than one hundred passengers.

The disclosure herein further provides a method of switching control of landing gear extension/retraction between respective control systems. There may be a first avionics control system and a second avionics control system. The method may include switching between the first avionics control system and the second avionics control system during extension. The method may include switching between the first avionics control system and the second avionics control system after landing gear retraction is completed. The method may include use of a control system according to the disclosure herein, possibly incorporating any optional features relating thereto. For example, the first processing module mentioned above may form a part of the first avionics control system and the second processing module may form a part of the second avionics control system.

The disclosure herein yet further provides a processing module programmed with a computer program to perform the function of one of the first processing module and second processing module according to the disclosure herein, possibly incorporating any optional features relating thereto. A computer program product may be provided separately for programming such a processing module. Thus the disclosure herein also provides a computer program product configured to cause, when the computer program is executed, a processing module to perform the function of the processing module according to the disclosure herein, possibly incorporating any optional features relating thereto.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings of which.

DETAILED DESCRIPTION

Figure 1:
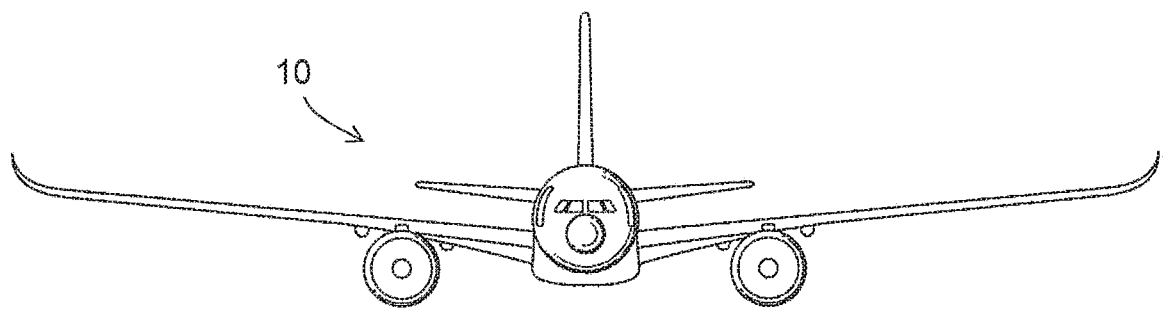
FIGS. 1 and 2 show an aircraft with its nose landing gear and main landing gear assemblies in a retracted position.
Figure 2:
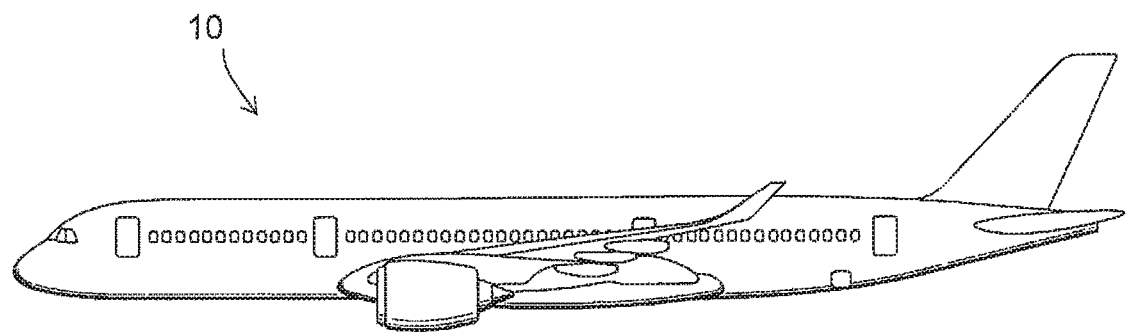
Figure 3:
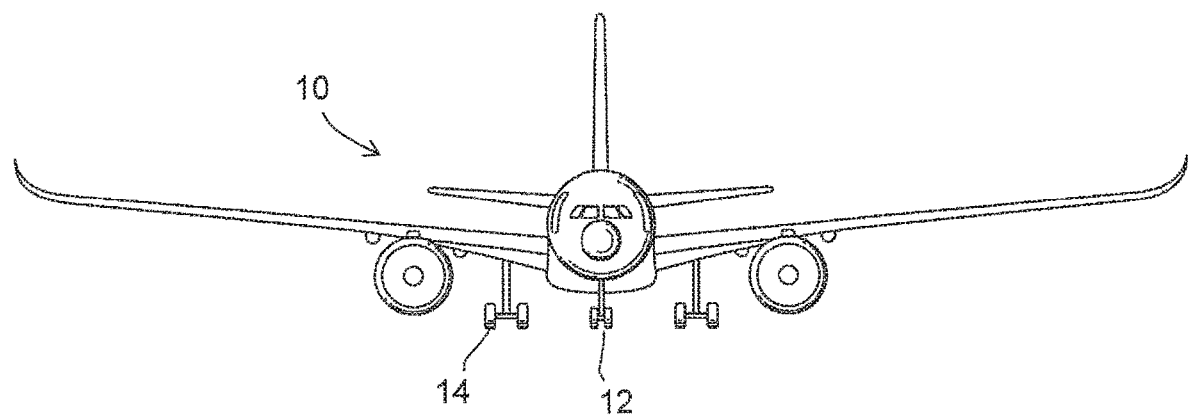
FIGS. 3 and 4 show the same aircraft with its nose landing gear and main landing gear assemblies in an extended position.
Figure 4:
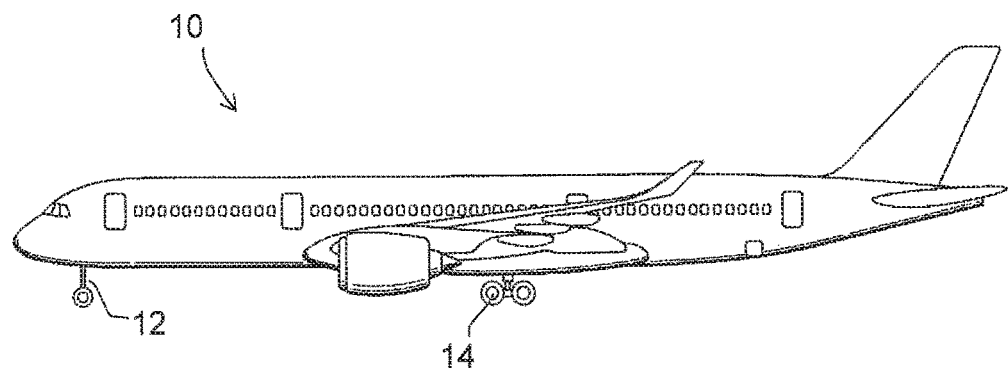

Embodiments of the disclosure herein relate to the switching of control between redundant avionics systems during extension and/or retraction of a landing gear assembly on an aircraft. In the illustrated embodiments there are two sides to the avionics systems, thus providing an operating side and a redundant (spare) side during operation of the aircraft. Such an aircraft is shown in FIGS. 1 through 4. FIGS. 1 and 2 show the aircraft 10 with its nose landing gear assembly (NLG) and main landing gear assembly (MLG) in the retracted position (i.e. stowed). FIGS. 3 and 4 show the same aircraft 10 with its NLG 12 and MLG 14 in the extended position (i.e. deployed).

Figure 5:
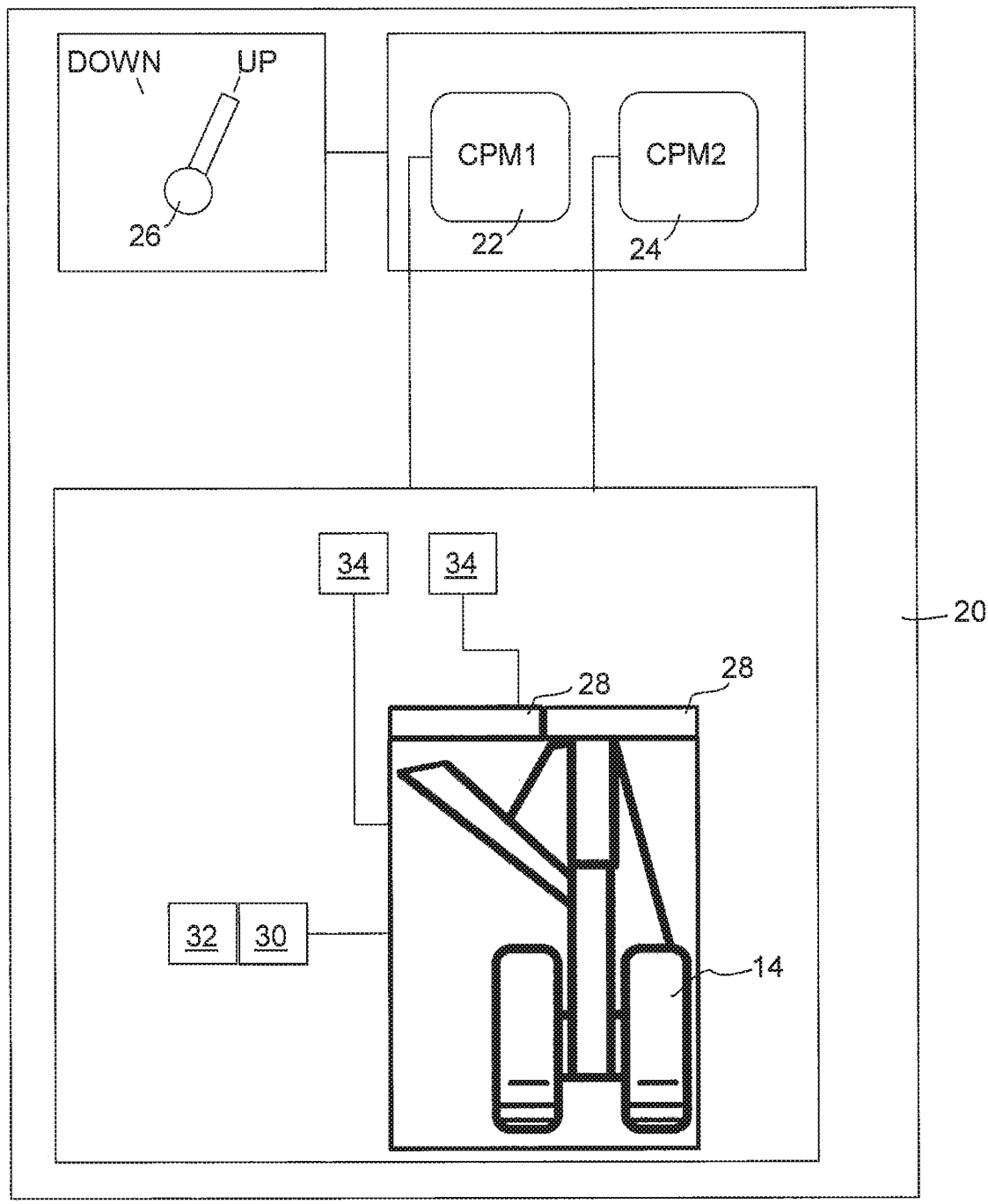
FIG. 5 shows a landing gear control system according to a first embodiment.

FIG. 5 shows a control system 20 for retracting and extending a landing gear assembly 14 according to a first embodiment. The control system comprises first and second control modules in the form of a first Computer Processing Module (see CPM1 22 in FIG. 5) and a second substantially identical Computer Processing Module (see CPM2 24 in FIG. 5). Thus, there are two "CPM"s which operate, as two independent sides of an avionics control system, thus providing redundancy. Each CPM 22, 24 is configured to perform, on receipt of an appropriate "UP" signal, a sequence of steps for retracting the landing gear assembly and also, on receipt of an appropriate "DOWN" signal, a sequence of steps for extending the landing gear assembly. The pilot is able to cause such an "UP" (or "DOWN") signal to be sent by operating a lever 26, provided for that purpose in the flight deck of the aircraft. (It will be appreciated that two levers may alternatively be provided one for initiating a "DOWN" instruction and the other for initiating an "UP" instruction). In FIG. 5, the lever 26 is shown having been moved to the "UP" position. The landing gear bay is associated with doors 28, which are operable to close over the aperture through which the landing gear 14 extends (fully closing over the aperture when the landing gear is retracted and partially closing over the aperture when the landing gear is extended). Locks are provided for locking the doors in the closed position. Various valves (collectively schematically represented by the box labelled with reference number 30) and associated solenoids (collectively schematically represented by the box labelled with reference number 32) are provided are provided for the operation of the locks. Each CPM 22, 24 is configured to issue control signals, which cause movement, activation (for example energising of a solenoid), deactivation, or other operation of a physical part of the landing gear extension/retraction apparatus. Such control signals may be converted/modified (for example, digitally processed and/or converted between a digital signal and an analogue signal) by avionics systems between transmission from the CPM and receipt by the intended recipient part (solenoid, for example). Also provided are sensors (represented by boxes 34) for detecting when the doors are open/closed and when the locks are locked/unlocked. Each CPM 22, 24 is thus also configured to receive sensor signals from such sensors. Such sensor signals may be converted/modified (for example, digitally processed and/or converted between an analogue signal and a digital signal) by avionics systems between transmission from the sensor and receipt by the CPM.

In accordance with the first embodiment, both CPMs 22, 24 are programmed to perform a step of changing over control from one avionics side to the other (i.e. passing control from one of the CPMs 22, 24 to the other). It is of course important that step of handing over control (or, seizing control, in the event of a detected failure of, or fault with, one side of the avionics system) is performed reliably and in a timely manner. The time taken for effecting changing over control from one avionics side to the other is a substantially constant time, and takes a fraction of a second. In accordance with the first embodiment as shown in FIG. 5, either the step of switching control is performed as part of a first sequence of steps for retracting the landing gear assembly, but only after the landing gear assembly has been retracted, or the step of switching control is performed as part of the second sequence of steps for extending the landing gear assembly. To understand why this provides a possible advantage, a comparison will be made with a system in which the step of switching control is performed at a different time.

Figure 6:
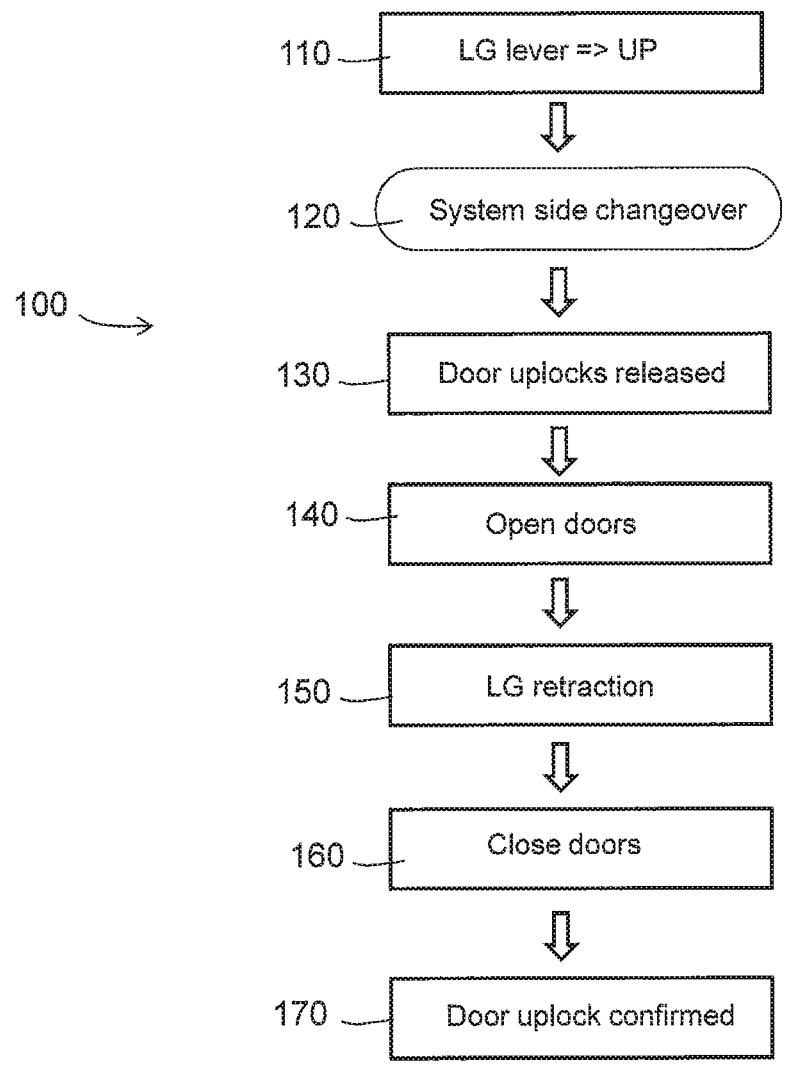
FIG. 6 shows a sequence of steps used to retract a landing gear assembly in accordance with a prior art method.

FIG. 6 shows a first sequence 100 of steps that are performed when retracting a landing gear in accordance with a prior art method (which is not in accordance with the disclosure herein), as will now be explained. As a first step 110, the pilot moves the LG control lever to the "UP" position. Then, as a second step 120, the avionics system side changeover step is performed. Control is handed from one of the CPMs to the other. This step takes about 0.1 seconds. Then as a third step 130, the door uplocks are released. This may be effected with the use of various solenoids/valves providing for the purpose. There may be two or more sub-steps to step 130. As a fourth step 140, the LG bay doors are opened. This may include a sub-step of first waiting for receipt of confirmation from a sensor that the door uplocks have been properly released, before opening the doors. Then as a fifth step 150, the LG is retracted. This may include a sub-step of first waiting for receipt of confirmation from a sensor that the doors have properly opened, before then retracting the LG. As a sixth step 160, the doors are then closed. This may include a sub-step of first waiting for receipt of confirmation from a sensor that the LG has fully retracted, before then closing the doors. Then as a seventh step 170, the door uplock is confirmed (for example by receipt of a signal from a sensor provided for that purpose) and the process is completed. It will be appreciated therefore that some steps as shown in FIG. 6 may each comprise one or more separately identifiable sub-steps. The steps shown in FIG. 6 may be performed in parallel for both the NLG and the MLG, although the sub-steps conducted for each NLG and MLG need not be identical. Each step shown in FIG. 6 is associated with an expected time. In the method illustrated by FIG. 6, the door uplock happens as a result of closing the doors; there is no separate control signal issued for the purpose of causing the door uplocks to lock in position, after the doors have closed.

Figure 7:
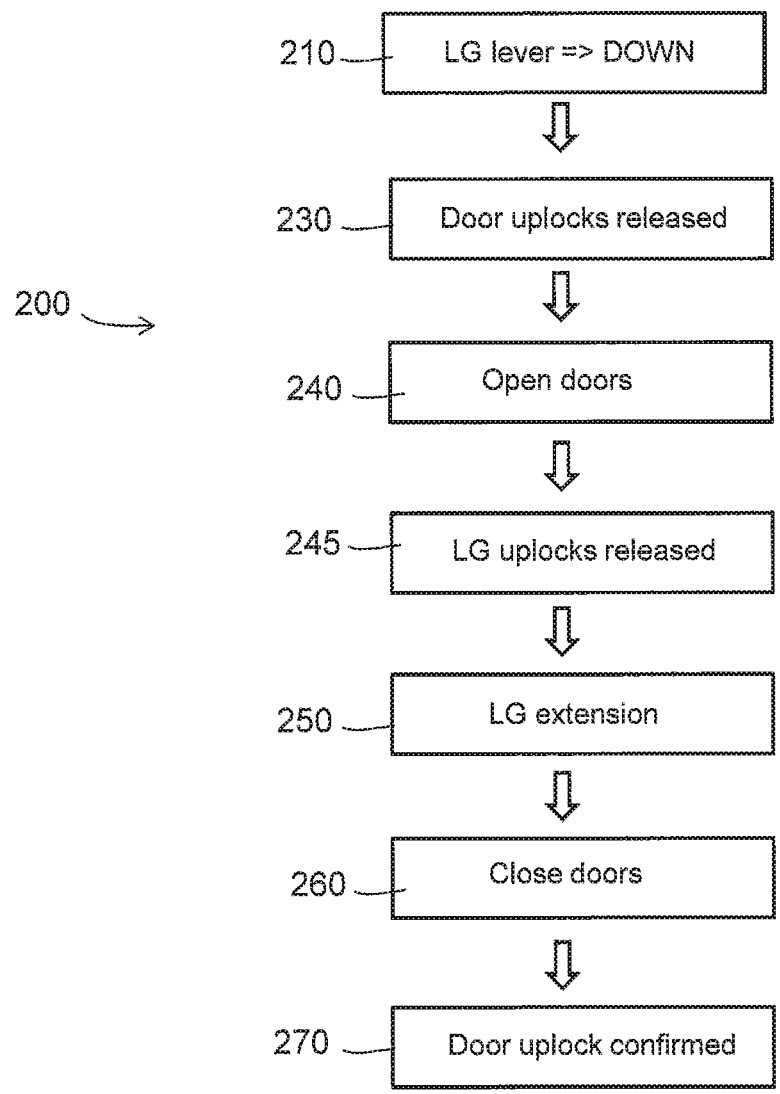
FIG. 7 shows a sequence of steps used to extend a landing gear assembly in accordance with the same prior art method as shown in FIG. 6.

FIG. 7 shows a second sequence 200 of steps that may be performed when extending a landing gear, in accordance with a prior art method (that complements the method shown by FIG. 6), as will now be explained in further detail. As a first step 210 (of this second sequence), the pilot moves the LG control lever to the "DOWN" position. Then, as a second step 230, the door uplocks are released. As a third step 240, the LG bay doors are opened. This may include a sub-step of first waiting for receipt of confirmation from a sensor that the door uplocks have been properly released, before opening the doors. Then as a fourth step 245, the LG uplocks are released. This may include a sub-step of first waiting for receipt of confirmation from a sensor that the doors have properly opened, before then releasing the LG uplocks. As a fifth step 250, the landing gear is extended. This may include a sub-step of first waiting for receipt of confirmation from a sensor that the LG uplocks have properly released, before then extending the LG. Then a sixth step 260 of closing the doors is performed. This may include a sub-step of first waiting for receipt of confirmation from a sensor that the LG has fully extended/been locked in position, before then closing the doors. Then as a seventh step 270, the door uplock is confirmed (for example by receipt of a signal from a sensor provided for that purpose) and the process is completed. It will be appreciated therefore that some steps as shown in FIG. 7 may each comprise one or more separately identifiable sub-steps. The steps shown in FIG. 7 may be performed in parallel for both the NLG and the MLG, although the sub-steps conducted for each NLG and MLG need not be identical. Each step shown in FIG. 7 is associated with an expected time.

It will be noted that a landing gear control system that comprises dual CPMs which operate, as two independent sides of an avionics control system for the purposes of redundancy and which are configured to retract a landing gear in accordance with the sequence of steps shown in FIG. 6 and are configured to extend a landing gear in accordance with the sequence of steps shown in FIG. 7, includes in the retraction sequence a delay of the order of 0.1 seconds as a result of the position in the sequence of the step 120 of the avionics system side changeover. By moving this step 120 after the landing gear assembly has been retracted or by removing the step completely from the first sequence of steps (for retracting the landing gear assembly), the time taken to retract the LG after the step 110 in which the pilot moves the LG control lever to the "UP" position is reduced. The LG assemblies may thus be retracted sooner, experience drag in the airstream for a shorter time, and thus improve efficiency of the aircraft during the ascent after take-off.

Figure 8:
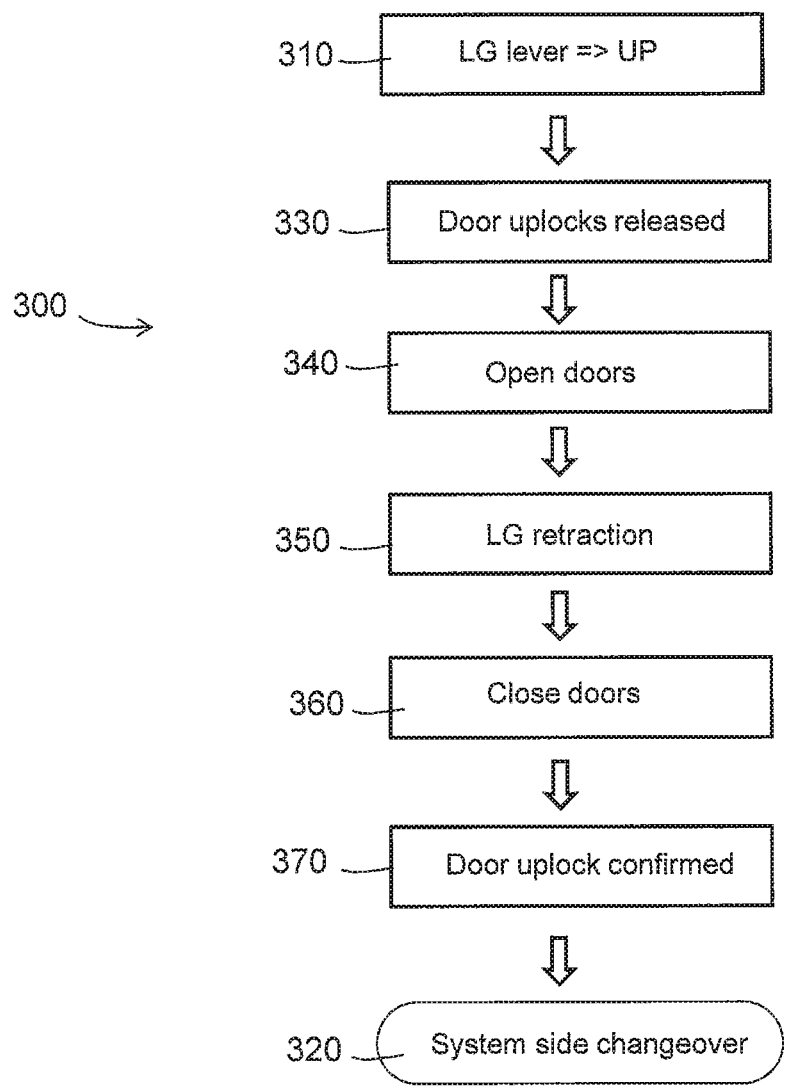
FIG. 8 shows a sequence of steps for retracting a landing gear assembly in accordance with a second embodiment.
Figure 9:
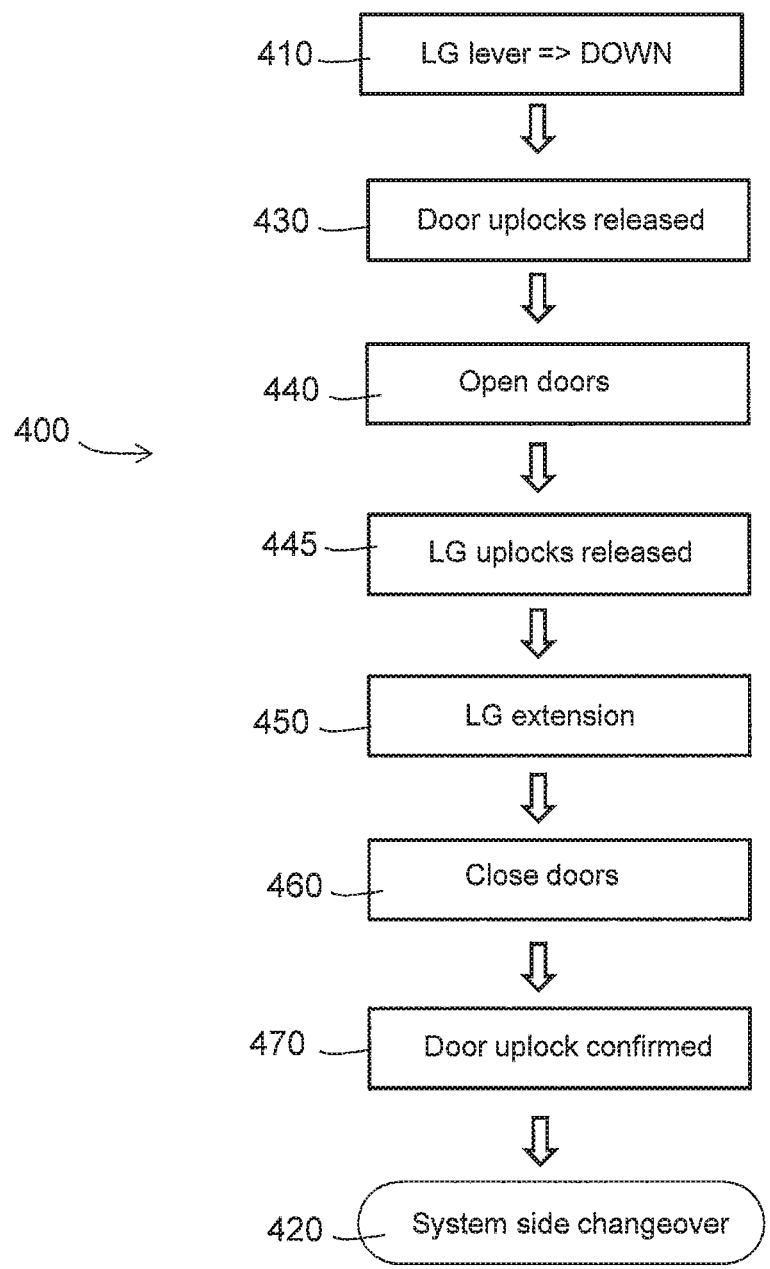
FIG. 9 shows a sequence of steps for extending a landing gear assembly in accordance with a third embodiment.
Figure 10:
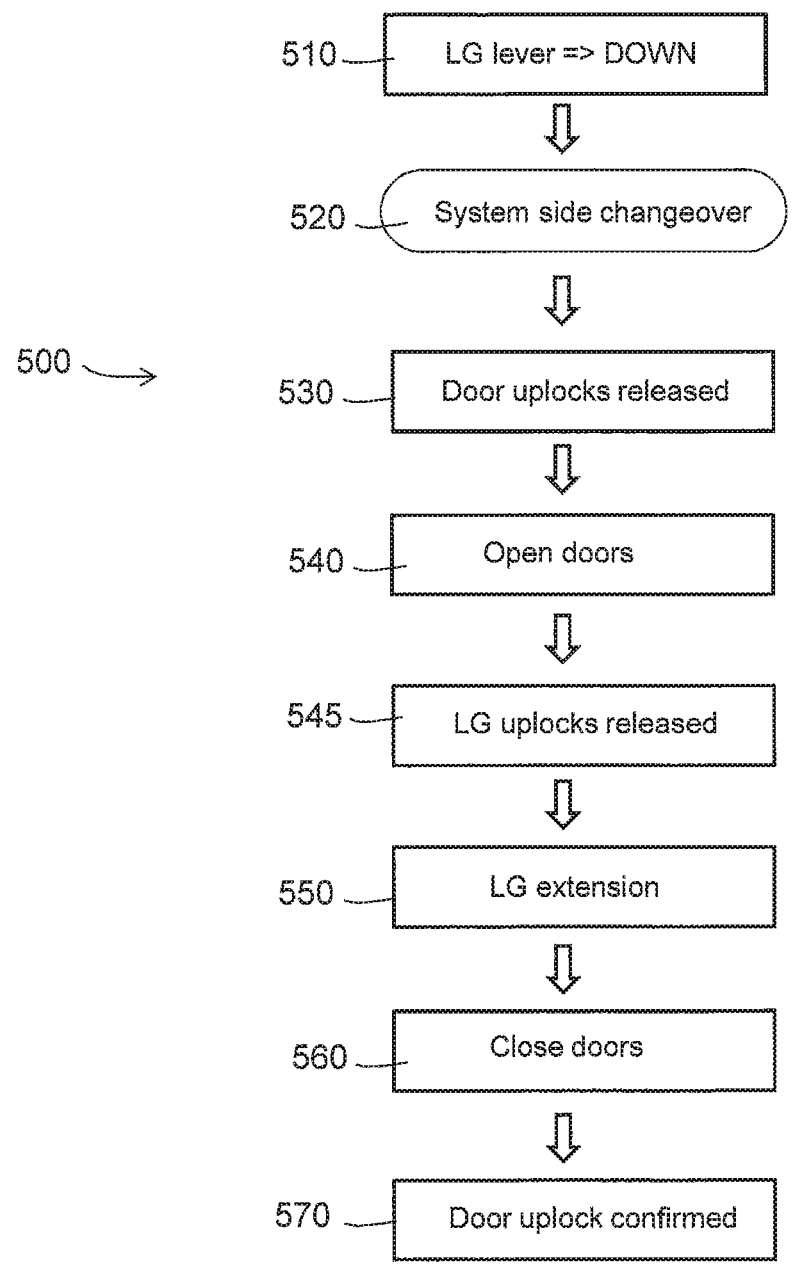
FIG. 10 shows a sequence of steps for extending a landing gear assembly in accordance with a fourth embodiment.

FIGS. 8 through 10 each show a sequence of steps that illustrates a different position of the avionics side changeover step, in accordance with various further embodiments of the disclosure herein.

One option, according to a second embodiment is shown in FIG. 8, which shows a modified first sequence 300 of steps (for retracting the landing gear assembly). The avionics side changeover step is performed at the end of the sequence not the start. Thus, the sequence of steps in FIG. 8 is as follows. As a first step 310, the pilot moves the LG control lever to the "UP" position. Then, as a second step 330, the door uplocks are released. As a third step 340, the LG bay doors are opened. Then as a fourth step 350, the LG is retracted. As a fifth step 360, the doors are then closed. Then as a sixth step 370, the door uplock is confirmed. The avionics side changeover step 320 is then performed and then the process is completed. The second sequence of steps that are performed when extending a landing gear in accordance with the second embodiment, is the same as shown in FIG. 7.

Another option, according to a third embodiment is shown in FIG. 9, which shows a modified second sequence 400 of steps (for extending the landing gear assembly). The avionics side changeover step is performed during this, second, sequence of steps (for extending the landing gear assembly) and not during the first sequence of steps (for retracting the landing gear assembly). The first sequence of steps (for retracting the landing gear assembly), according to this third embodiment, is thus the same as shown in FIG. 6, except that the step 120 of the avionics system side changeover is not performed until the second sequence of steps is conducted. In this embodiment, the avionics side changeover step is performed at the end of the second sequence of steps. Thus, the sequence of steps shown in FIG. 9 is as follows. As a first step 410, the pilot moves the LG control lever to the "DOWN" position. Then, as a second step 430, the door uplocks are released. As a third step 440, the LG bay doors are opened. Then as a fourth step 445, the LG uplocks are released. As a fifth step 450, the landing gear is extended. Then a sixth step 460 of closing the doors is performed. Then as a seventh step 470, the door uplock is confirmed. The avionics side changeover step 420 is then performed and then the process is completed.

Yet another option, according to a fourth embodiment is shown in FIG. 10, which shows a modified second sequence 500 of steps (for extending the landing gear assembly). This option is substantially identical to the third embodiment, except that the avionics side changeover step is performed at the start of the second sequence of steps instead of the end. Thus, the sequence of steps shown in FIG. 10 is as follows. As a first step 510, the pilot moves the LG control lever to the "DOWN" position. Then, as a second step 520, the avionics side changeover step is performed. As a third step 530, the door uplocks are released. As a fourth step 540, the LG bay doors are opened. Then as a fifth step 545, the LG uplocks are released. As a sixth step 550, the landing gear is extended. Then a seventh step 560 of closing the doors is performed. Then as an eighth step 570, the door uplock is confirmed and then the process is completed. This fourth embodiment has the same advantages as the first to third embodiments. The fourth embodiment also provides a further useful, but optional, feature for effecting an avionics side changeover, without needing to move the LG at all. It is possible for the pilot to move the LG control lever to the "DOWN" position (and thus cause an avionics side changeover—step 520) but then immediately move the lever back from the "DOWN" position, so as to abort the sequence of subsequent steps (steps 530 to 570).

It may be the case, in each of the second to fourth embodiments, that the sum of the time taken to perform the first sequence of steps for retracting the landing gear assembly and the time taken to perform the second sequence of steps for extending the landing gear assembly, is substantially the same as the sum time taken in the prior art illustrated by FIGS. 6 and 7, while reducing the time in which the landing gear remains deployed after take-off. It is the case of course that in the third and fourth embodiments, the time taken to perform the second sequence of steps for extending the landing gear assembly is increased compared to the time taken in the method illustrated by FIG. 7.

While the disclosure herein has been described and illustrated with reference to particular embodiments, it will be appreciated by those of ordinary skill in the art that the disclosure herein lends itself to many different variations not specifically illustrated herein.

The disclosure herein also provides a control system for retracting and extending a landing gear assembly in an aircraft, wherein the control system comprises a first processing module and a second processing module, each of the first and second processing modules being able to control retraction and extension of the landing gear assembly independently of the other thus providing redundancy, each of the processing modules is configured to perform a first sequence of steps for retracting the landing gear assembly and a second sequence of steps for extending the landing gear assembly, each of the first and second processing modules are configured to perform a step of switching control from one of the first processing module and the second processing module to the other of the first processing module and the second processing module, and wherein each of the processing modules is so configured that the first sequence of steps for retracting the landing gear assembly does not include a step of switching control before the landing gear assembly has been retracted.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the claims. Moreover, it is to be understood that such optional integers or features, while of possible benefit in some embodiments of the disclosure herein, may not be desirable, and may therefore be absent, in other embodiments.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A control system for retracting and extending a landing gear assembly in an aircraft, comprising:
a first one or more processor and a second one or more processor, each of the first and second processors being configured to control retraction and extension of the landing gear assembly independently, thus, providing redundancy;
each of the first and second processors being further configured to perform a first sequence of steps for retracting the landing gear assembly and a second sequence of steps for extending the landing gear assembly; and
at least one of the first sequence of steps and the second sequence of steps comprising a step of switching control between the first one or more processors and the second one or more processors, and wherein
the step of switching control is performed
(a) as part of the first sequence of steps for retracting the landing gear assembly, but only after the landing gear assembly has been retracted, or
(b) as part of the second sequence of steps for extending the landing gear assembly.

2. The control system according to claim 1, wherein each of the first and second processors is configured such that the first sequence of steps for retracting the landing gear assembly does not include a step of switching control before the landing gear assembly has been retracted.

3. The control system according to claim 1, wherein each of the first and second processors is configured such that the step of switching control is performed as part of the second sequence of steps for extending the landing gear assembly and is performed before the landing gear assembly starts moving from its retracted position to its extended position.

4. The control system according to claim 3, wherein:
each of the first and second processors is configured to perform, during the second sequence of steps but before the landing gear assembly starts moving from its retracted position to its extended position, a step of issuing a control signal that causes one or more landing gear bay doors to open; and
each of the first and second processors is configured such that the step of switching control is performed before the step of issuing the control signal that causes the landing gear bay door(s) to open.

5. The control system according to claim 4, wherein:
each of the first and second processors is configured to perform, during the second sequence of steps but before step of issuing the control signal that causes the landing gear bay door(s) to open, a step of issuing a control signal that causes unlocking of the landing gear bay door(s); and each of the first and second processors is configured such that the step of switching control is performed before the step of issuing the control signal that causes unlocking of the landing gear bay door(s).

6. The control system according to claim 3, wherein:
each of the first and second processors is configured such that the step of switching control is performed immediately after receipt of a control signal or other input that initiates the second sequence of steps for extending the landing gear assembly.

7. The control system according to claim 1, wherein each of the first and second processors is configured to perform, during the first sequence of steps but after the landing gear assembly has been retracted, a step of issuing a control signal that causes one or more landing gear bay doors to close, and
each of the first and second processors is configured such that the step of switching control is performed as part of the first sequence of steps for retracting the landing gear assembly, but after the step of issuing the control signal that causes landing gear bay door(s) to close.

8. The control system according to claim 7, wherein:
each of the first and second processors is configured to perform, during the first sequence of steps but after the step of issuing the control signal that causes the landing gear bay door(s) to close, a step of causing and/or detecting locking of the landing gear bay door(s), and
each of the first and second processors is configured such that the step of switching control is performed after the step of causing and/or detecting locking of the landing gear bay door(s).

9. The control system according to claim 1, wherein each of the first and second processors is configured such that the step of switching control is performed as part of the second sequence of steps for extending the landing gear assembly, but only after the landing gear assembly has been extended.

10. The control system according to claim 9, wherein each of the first and second processors is configured to perform, during the second sequence of steps but after the landing gear assembly has been extended, a step of issuing a control signal that causes one or more landing gear bay doors to close, and
wherein each of the first and second processors is configured such that the step of switching control is performed after the step of issuing the control signal that causes landing gear bay door(s) to close.

11. The control system according to claim 10, wherein:
each of the first and second processors is configured to perform, during the second sequence of steps but after the step of issuing the control signal that causes the landing gear bay door(s) to close, a step of causing and/or detecting locking of the landing gear bay door(s), and
each of the first and second processors is configured such that the step of switching control is performed after the step of causing and/or detecting locking of the landing gear bay door(s).

12. An aircraft comprising a control system according to claim 1, and a retractable landing gear assembly.

13. A method of switching control of landing gear extension/retraction between a first avionics control system and a second avionics control system, wherein the method comprises:
using a control system for retracting and extending a landing gear assembly in an aircraft, the control system comprising:
a first one or more processors and a second one or more processors, each of the first and second processors being configured to control retraction and extension of the landing gear assembly independently thus providing redundancy;
each of the first one or more processors and the second one or more processors being further configured to perform a first sequence of steps for retracting the landing gear assembly and a second sequence of steps for extending the landing gear assembly; and
at least one of the first sequence of steps and the second sequence of steps comprising a step of switching control between the first one or more processors and the second one or more processors, and wherein
the step of switching control is performed
(a) as part of the first sequence of steps for retracting the landing gear assembly, but only after the landing gear assembly has been retracted, or
(b) as part of the second sequence of steps for extending the landing gear assembly; and
wherein the first one or more processors forms a part of the first avionics control system and the second one or more processors forms a part of the second avionics control system.

14. A processing module programmed with a non-transitory computer program to perform steps comprising:
using a control system for retracting and extending a landing gear assembly in an aircraft, the control system comprising:
a first one or more processors and a second one or more processors, each of the first and second one or more processors being configured to control retraction and extension of the landing gear assembly independently thus providing redundancy;
each of the processors being further configured to perform a first sequence of steps for retracting the landing gear assembly and a second sequence of steps for extending the landing gear assembly; and
at least one of the first sequence of steps and the second sequence of steps comprising a step of switching control between from one of the first one or more processors and the second one or more processors module to the other of the first processing module and the second processing module, and wherein
the step of switching control is performed
(a) as part of the first sequence of steps for retracting the landing gear assembly, but only after the landing gear assembly has been retracted, or
(b) as part of the second sequence of steps for extending the landing gear assembly; and
wherein the first one or more processor forms a part of the first avionics control system and the second one or more processor forms a part of the second avionics control system.

15. A non-transitory computer program product configured to cause, when the computer program is executed, one or more processors to perform steps of the processing module of claim 14.

* * * * *